(12) United States Patent
Takehara et al.

(10) Patent No.: US 6,761,581 B2
(45) Date of Patent: Jul. 13, 2004

(54) AC INTERCONNECTION APPARATUS FOR SUPPLYING AC POWER FROM A COMMERCIAL POWER SYSTEM AND FROM A SOLAR CELL

(75) Inventors: Nobuyoshi Takehara, Kyoto (JP); Hiroshi Kondo, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/435,052

(22) Filed: May 12, 2003

(65) Prior Publication Data

US 2003/0197429 A1 Oct. 23, 2003

Related U.S. Application Data

(62) Division of application No. 09/984,391, filed on Oct. 30, 2001, now Pat. No. 6,605,881.

(30) Foreign Application Priority Data

Oct. 31, 2000 (JP) .................................... 2000-332897
Oct. 25, 2001 (JP) .................................... 2001-328065

(51) Int. Cl.$^7$ ............................................ H01R 11/00
(52) U.S. Cl. .................................... 439/502; 439/218
(58) Field of Search .................... 307/86; 439/502, 439/638, 217, 218, 582

(56) References Cited

U.S. PATENT DOCUMENTS

| | | | | |
|---|---|---|---|---|
| 4,697,136 A | | 9/1987 | Ishikawa .................... 323/906 |
| 4,725,740 A | | 2/1988 | Nakata .......................... 307/64 |
| 4,862,141 A | * | 8/1989 | Jordal ........................ 340/521 |
| 5,323,535 A | | 6/1994 | Sakaki et al. .................. 29/852 |
| 5,493,155 A | * | 2/1996 | Okamoto et al. ............. 307/45 |
| 5,548,504 A | * | 8/1996 | Takehara ...................... 363/65 |
| 5,592,074 A | | 1/1997 | Takehara .................... 363/131 |
| 5,621,300 A | | 4/1997 | Sato et al. ...................... 320/5 |
| 5,627,737 A | | 5/1997 | Maekawa et al. ............ 307/73 |
| 5,669,987 A | | 9/1997 | Takehara et al. ............ 136/244 |
| 5,714,869 A | | 2/1998 | Tamechika et al. ........... 320/30 |
| 5,751,133 A | | 5/1998 | Sato et al. ...................... 320/13 |
| 5,869,956 A | | 2/1999 | Nagao et al. ................ 323/299 |
| 5,878,584 A | | 3/1999 | Sasaki et al. ................ 323/906 |
| 5,892,354 A | | 4/1999 | Nagao et al. ................ 323/299 |
| 5,923,158 A | | 7/1999 | Kurokami et al. ........... 323/299 |
| 5,929,538 A | | 7/1999 | O'Sullivan et al. ........... 307/64 |
| 5,955,885 A | | 9/1999 | Kurokami et al. ........... 324/426 |
| 5,977,659 A | | 11/1999 | Takehara et al. ............. 307/85 |
| 5,986,354 A | | 11/1999 | Nagao et al. .................. 307/64 |
| 6,015,081 A | | 1/2000 | Okabayahsi et al. ... 228/180.22 |
| 6,101,073 A | | 8/2000 | Takehara ..................... 361/42 |
| 6,137,280 A | * | 10/2000 | Ackermann et al. ........ 323/354 |
| 6,184,593 B1 | | 2/2001 | Jungreis ....................... 307/80 |
| 6,219,623 B1 | | 4/2001 | Willis .......................... 307/45 |
| 6,278,052 B1 | | 8/2001 | Takehara et al. ............ 136/244 |
| 6,313,438 B1 | * | 11/2001 | Emerick, Jr. ................ 219/212 |
| 6,320,769 B2 | | 11/2001 | Kurokami et al. ........ 363/56.03 |
| 6,429,546 B1 | | 8/2002 | Ropp et al. .................... 307/87 |
| 6,493,246 B2 | | 12/2002 | Suzui et al. .................. 363/95 |
| 6,530,085 B1 | * | 3/2003 | Perlman ....................... 725/82 |
| 6,605,881 B2 | * | 8/2003 | Takehara et al. ............. 307/86 |
| 2001/0004198 A1 | * | 6/2001 | Matsuyama ................. 320/101 |

FOREIGN PATENT DOCUMENTS

| | | |
|---|---|---|
| JP | 5-108176 | 4/1993 |
| JP | 11-308775 | 11/1999 |

* cited by examiner

Primary Examiner—Michael C. Zarroli
(74) Attorney, Agent, or Firm—Fitzpatrick, Cella, Harper & Scinto

(57) ABSTRACT

An AC interconnection apparatus has an input terminal for a commercial power system, a connection terminal to a solar cell, an output terminal connected to a load, an inverter for converting the output voltage of the solar cell into an AC voltage, and a current detector arranged on the load side of an AC connection point for connecting the AC output from the inverter and the commercial power. When a power value calculated on the basis of a current detection value by the current detector and the voltage of the commercial power system is less than the output power of the inverter, the output of the inverter is suppressed, thereby suppressing reverse power flow to the commercial power system. When the current value detected by the current detector exceeds a predetermined value, power supply to the load is stopped using a breaker.

2 Claims, 9 Drawing Sheets

US 6,761,581 B2

AC INTERCONNECTION APPARATUS FOR SUPPLYING AC POWER FROM A COMMERCIAL POWER SYSTEM AND FROM A SOLAR CELL

This is a divisional application of application Ser. No. 09/984,391, filed Oct. 30, 2001 now U.S. Pat. No. 6,605,881.

FIELD OF THE INVENTION

The present invention relates to an AC interconnection solar power generation apparatus and control method therefor.

BACKGROUND OF THE INVENTION

An example of the use form of a solar power generation system is a DC interconnection system disclosed in Japanese Patent Laid-Open No. 5-108176. In this system, the output from an AC/DC converter 100 that receives commercial power 2 and the output from a solar cell 3 are connected, and the DC power thus obtained is converted into AC power by an inverter 110 and supplied to a load 4, as shown in FIG. 9. Such a system form can be regarded as a simple "load" from the viewpoint of preventing any reverse power flow to the commercial power system. For this reason, when deregulation about electric power greatly progresses in the future, individuals can freely use such a solar power generation system.

In the prior art, however, the capacity of the load 4 is limited by the capacity of the inverter 110. In addition, no measures are taken against unnecessary current leakage of the solar cell 3 due to the stray capacitance to ground, i.e., no device for safety use of the solar cell 3 is disclosed.

Another example that may make it possible to freely use a system as a "load" is an AC interconnection system which prevents any reverse power flow. Unlike the above-described system, commercial power and AC power from a power generator are connected without any conversion and supplied to a load, and the power generator is stopped upon detecting reverse power flow from the power generator to the commercial power system, using a protective relay for detecting reverse power to the commercial power. In this prior art, the limitation on the load capacity due to the output inverter 110 is not present, unlike the arrangement shown in FIG. 9, though the commercial power and power generator parallelly supply power to the load. For this reason, along with an increase in power generated by the power generator, a usable load capacity may exceed the rated load capacity to cause a load current beyond the rated value to flow, resulting in danger.

SUMMARY OF THE INVENTION

The present invention has been made to solve these problems, and has as its object to provide an AC interconnection apparatus capable of easily, safely, and efficiently using a solar cell and a control method therefor.

It is another object of the present invention to provide an AC interconnection apparatus capable of preventing any reverse power flow to a commercial power system even when power generated by a solar cell increases in an apparatus which supplies both commercial power and AC power from the solar cell to a load, and a control method therefor.

It is still another object of the present invention to provide an AC interconnection apparatus capable of preventing any overpower to a load in an apparatus which supplies both commercial power and AC power from a solar cell to the load, and a control method therefor.

In order to achieve the above described objects, an AC interconnection apparatus of the present invention comprising the structures as follows.

An AC interconnection apparatus for supplying to a load both AC power from a commercial power system and an output from a solar cell, comprising: an inverter for converting the output from the solar cell into AC power; a current detector arranged between the load and an AC connection point for connecting the AC input from the commercial power system and the AC output from the inverter to detect a current flowing to the load; and control means for obtaining load power applied to the load on the basis of a voltage value at the AC connection point and the current value detected by the current detector and controlling the output of the inverter on the basis of the load power and the output power of said inverter.

In order to achieve the above described objects, a control method for an AC interconnection apparatus of the present invention comprising the steps as follows.

A control method for an AC interconnection apparatus for supplying to a load both AC power from a commercial power system and an output from a solar cell, comprising: a current detection step of detecting a current flowing to the load between the load and an AC connection point for connecting the AC input from the commercial power system and an AC output from an inverter for converting the output from the solar cell into AC power; and a control step of obtaining load power applied to the load on the basis of a voltage value at the AC connection point and the current value detected in the current detection step and controlling the output of the inverter on the basis of the load power and the output power of the inverter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will be described below in detail with reference to the accompanying drawings.

<First Embodiment>

[Outer Appearance and Connection Terminal]

Figure 1:
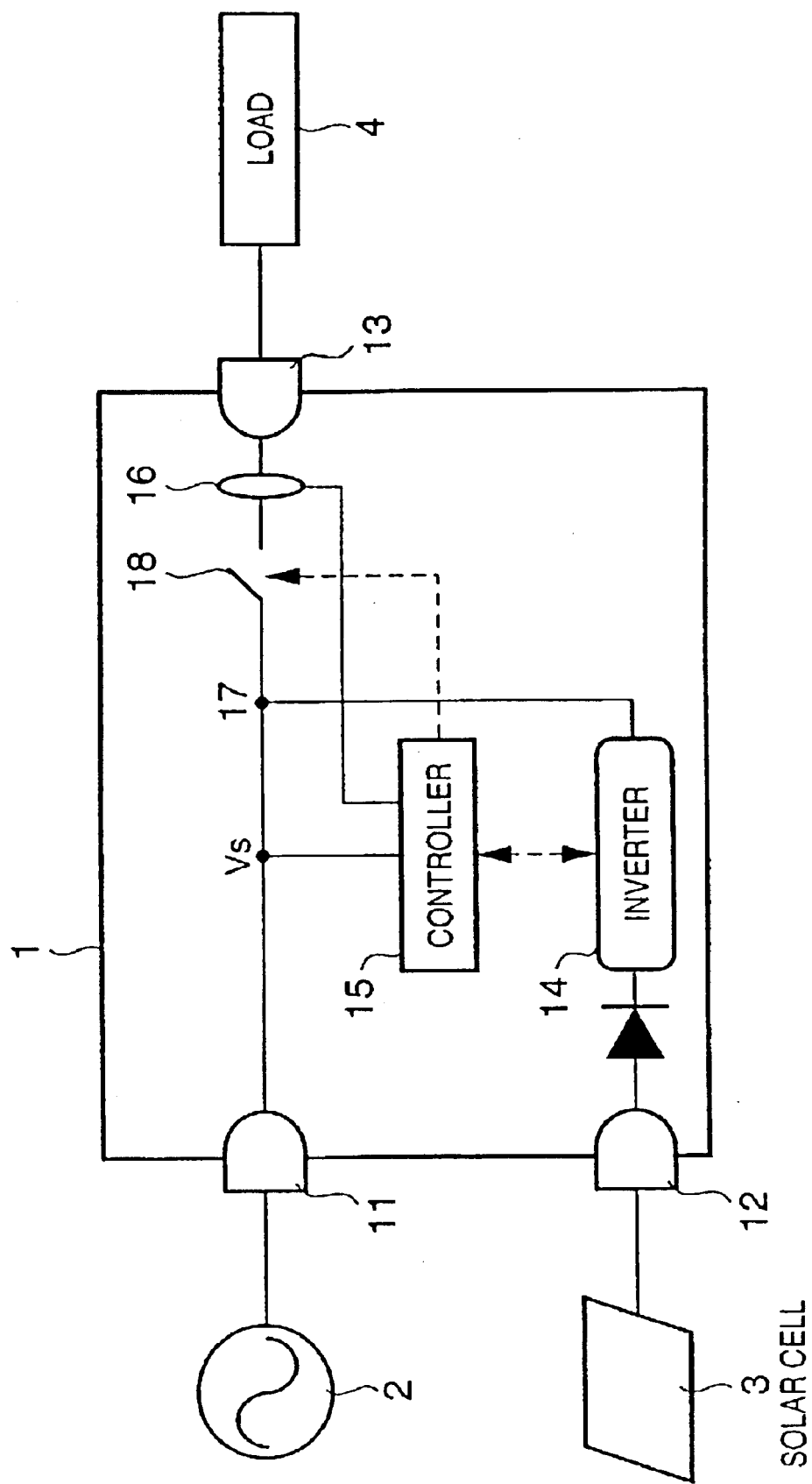
FIG. 1 is a block diagram showing the arrangement of an AC interconnection apparatus according to the first embodiment of the present invention.
Figure 2:
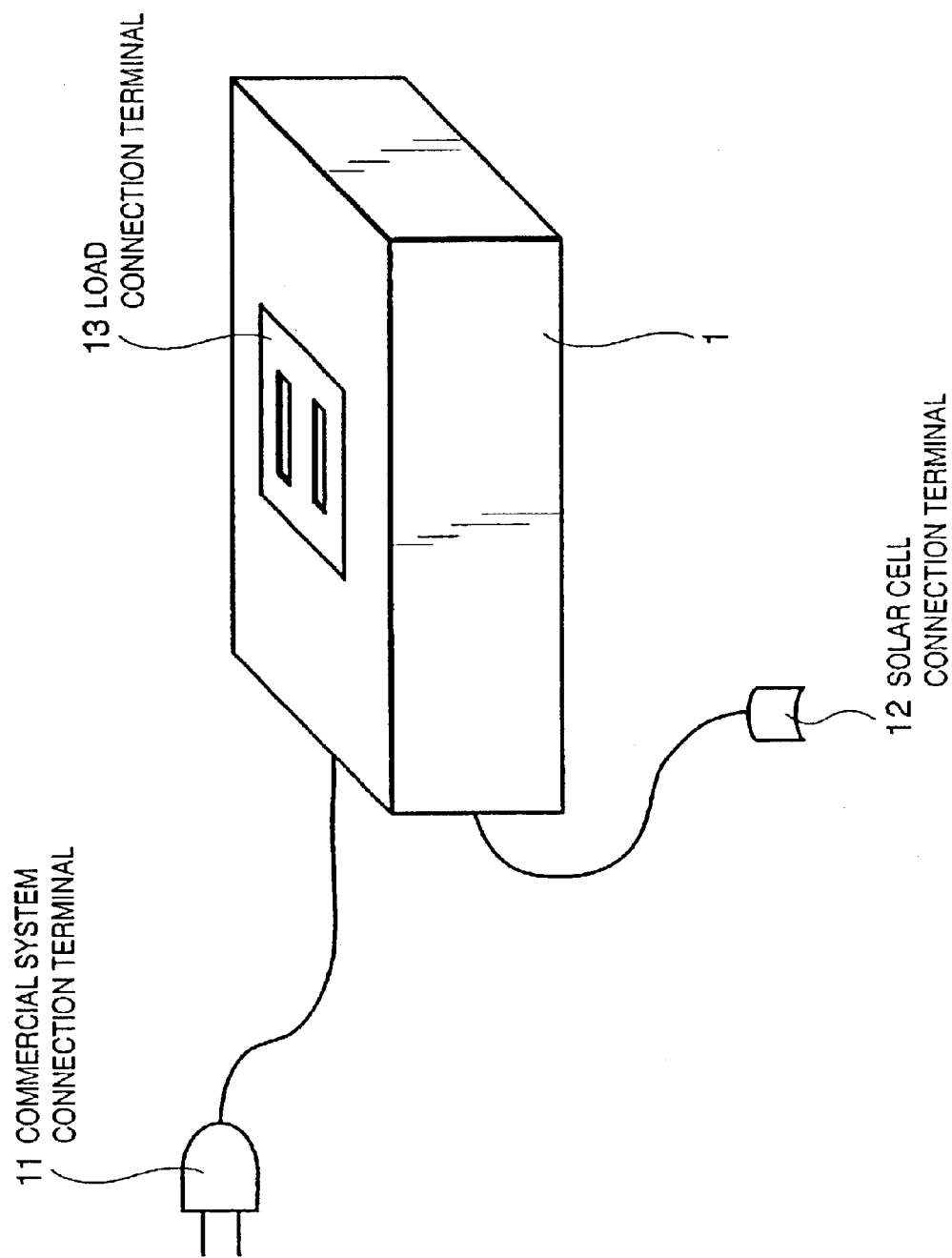
FIG. 2 is a view showing the outer appearance of the AC interconnection apparatus according to the embodiment of the present invention.

FIG. 1 shows the arrangement of an AC interconnection apparatus 1 according to the first embodiment, and FIG. 2 shows the outer appearance of the apparatus.

As shown in FIG. 2, the AC interconnection apparatus 1 according to this embodiment has a shape like a so-called table tap and has a plug-shaped connection terminal 11 to a commercial power system, a wall-socket-shaped (receptacle-shaped) load connection terminal 13, and a solar cell connection terminal 12 having a shape different from the terminal 11. The solar cell connection terminal 12 has a shape different from the terminal 11 to prevent any connection error, i.e., for safety. The terminals can have various shapes as far as they prevent any connection error. It is preferable that the terminal 12 has a different shape from the terminal 13 in the same point as the above described reason. Instead of using these terminals, a screwed terminal may be used. For practical use, however, connectors are preferably used, as in this embodiment.

[System Interconnection Inverter]

As a system-interconnection inverter 14, a well-known sine-wave PWM inverter (incorporating a commercial insulating transformer) formed from a boosting chopper and full-bridge circuit is used. As an insulating method, a method called high-frequency insulation using a high-frequency transformer may be used. In the high-frequency insulation, the transformer can be made compact, and it is very preferable for this embodiment. Many methods are known as a method of controlling the inverter 14, and a detailed description thereof will be omitted. Generally, many system interconnection inverters for solar power generation employ a control method called "instantaneous current control". Briefly speaking, in this control method, an "output current reference waveform" is input, and a switch circuit is controlled such that the reference waveform matches a current waveform to be actually output. Output power is determined by the amplitude and the phase difference from the system voltage. Since the inverter is often used at a power factor of 1 by fixing the phase difference to 0, it can be regarded that the output is proportional to the amplitude. The inverter 14 also has a maximum power tracking function and a control function of maintaining the input voltage from a solar cell 3, when the output from the solar cell 3 is maximized.

A controller 15 of the inverter 14 normally incorporates a function of detecting the output current and output power of the inverter 14. In this embodiment, reverse power flow preventing operation is performed using this function. The capacity of the inverter 14 is 50 W, though it is appropriately selected in accordance with the capacity of the solar cell 3 connected. If the inverter 14 has a large capacity, the capacity of the usable solar cell 3 can also be increased. However, a necessary and minimum capacity is preferable because a large capacity inevitably causes an increase in size and cost of the apparatus.

[Solar Cell]

As the solar cell 3, a crystal-based solar cell (output power: 50 W, output voltage: 16 V) is used. When such a low-voltage module is used, the safety for human body and the like can be increased. Especially, since a low-voltage-output solar cell with an output voltage lower than 30 V is excluded from electric equipment to which the Electricity Utilities Industry Law applies, the breakdown voltage can also be made low, and as a result, cost reduction can be expected. Additionally, it is generally supposed that such a low-voltage solar cell rarely causes an electrical shock as compared to a high-voltage solar cell and is therefore easy to handle for end users who have no special knowledge.

[Load and Commercial Power System]

Figure 9:
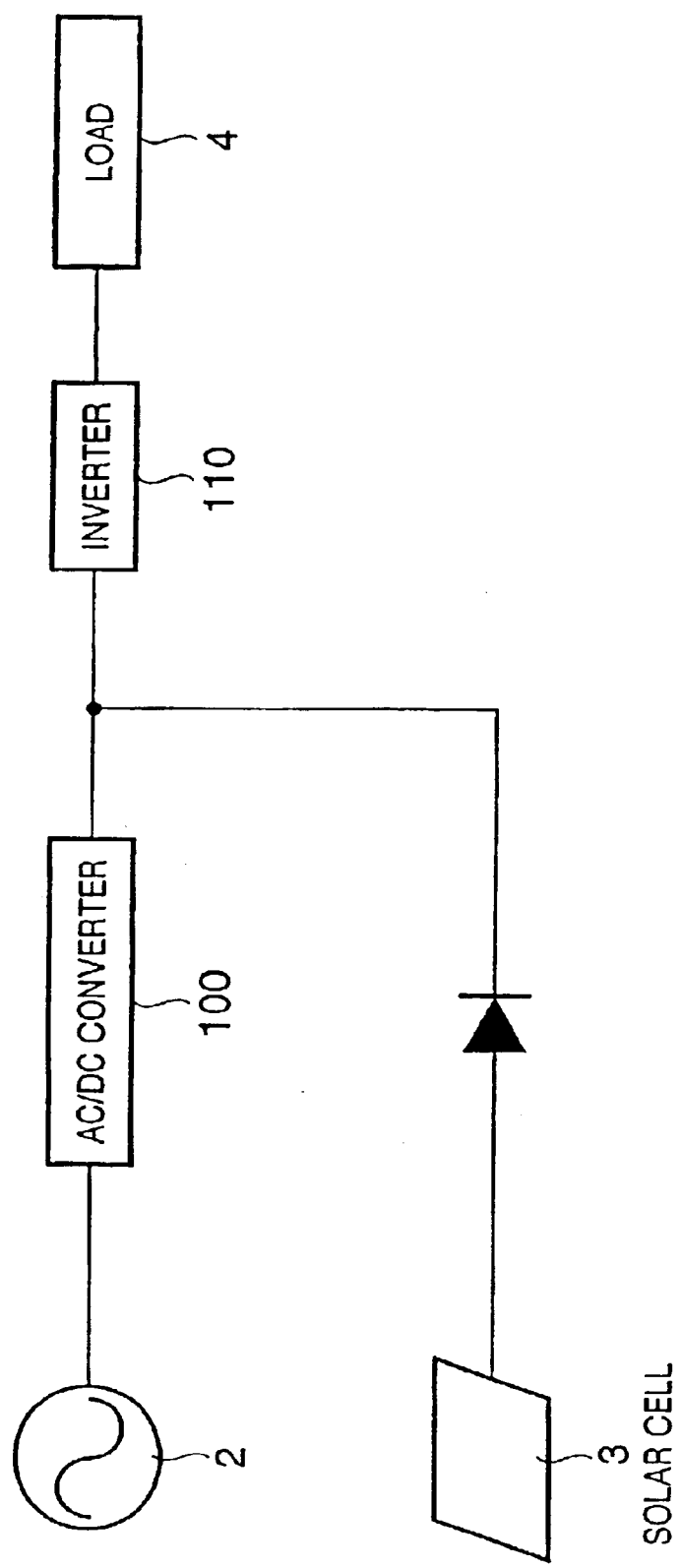
FIG. 9 is a view for explaining a prior art.

As an experimental load 4, an electric bulb (60 W) is used. As a commercial power system, a 100-V/60-Hz system is used. They are not particularly limited to the above load and system and can be appropriately selected as needed. In this embodiment, the load 4 can directly receive power from the commercial power system 2, unlike the DC interconnection apparatus shown in FIG. 9. Hence, the capacity of the load 4 can be set to the full rated current determined by the receptacle shapes shown in FIG. 2 or the thickness of an electrical wire. For example, when the shapes of this embodiment are selected, the rated capacity is 15 A to 20 A, so a load of 2 kVA can be connected. To the contrary, in the above-described conventional DC interconnection apparatus, an inverter having a capacity of 2 kVA is required to drive a load of 2 kVA, resulting in a bulky apparatus.

[Current Detector and Breaker]

As a current detector 16, a normal current transformer that is often used is used. The set position is between an AC connection point 17 and the load connection terminal 13, as shown in FIG. 1. Unless the current detector 16 is set at this position, it cannot directly detect the load current. To detect the current, many known devices such as a device using a Hall element can be selected. As a breaker 18, a commercially available breaker or power relay can be used. A compact power relay for a power circuit is used here.

[Controller]

The controller 15 controls the inverter 14 or other switch circuits, and a well-known one-chip microcomputer or sequencer can be used. In this embodiment, as the controller 15, a commercially available one-chip microcomputer is used. However, any change can be made if the object of the present invention can be achieved. In this embodiment, the power supply voltage of the controller 15 is obtained from a point Vs. How to obtain the power supply voltage is not particularly limited. The voltage at the connection point Vs is also used to detect the voltage of the commercial power system, which is necessary for power calculation.

[Operation]

① Reverse Power Flow Preventing Operation (Reverse Power-flow Protection)

Figure 3:
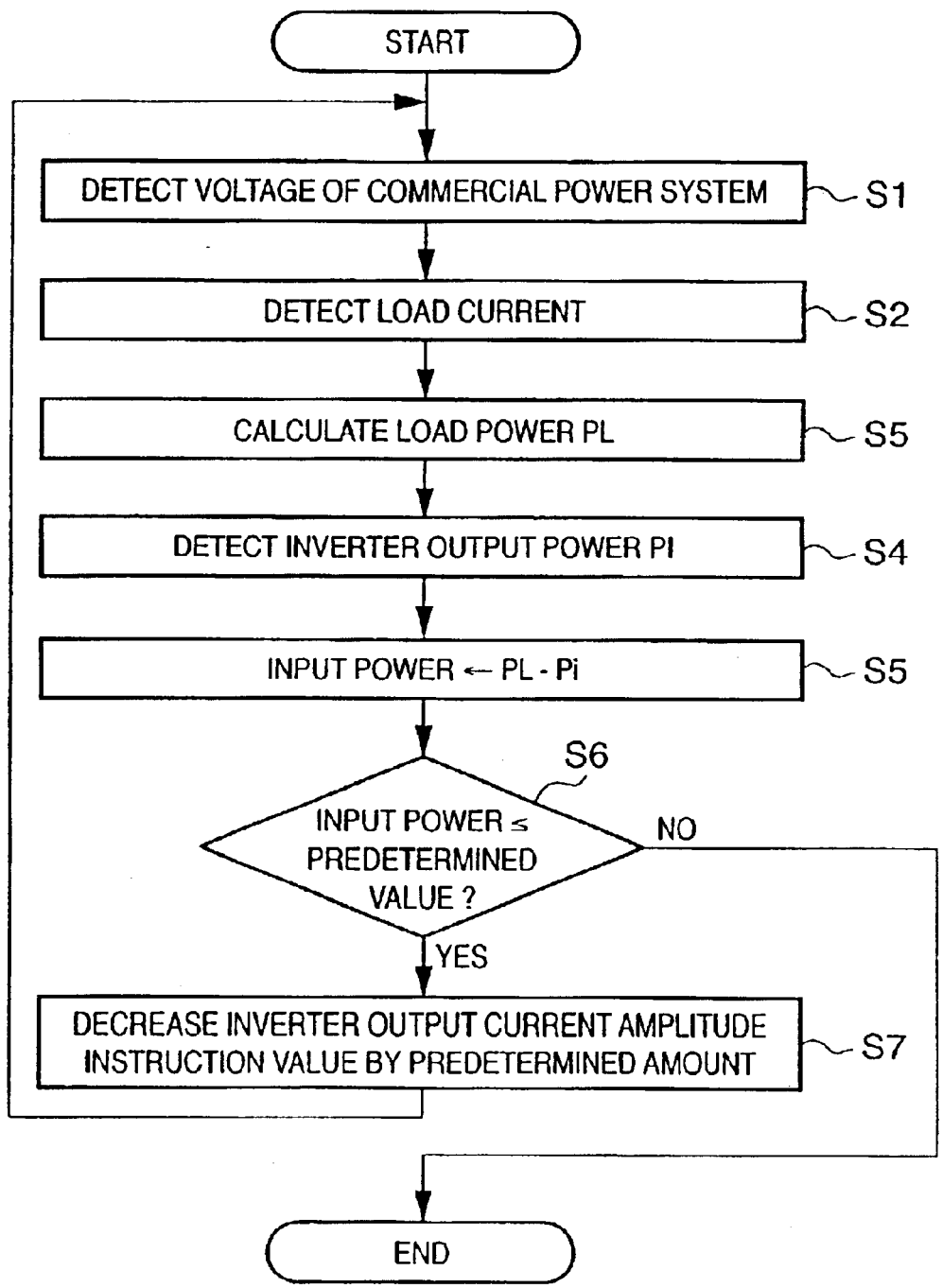
FIG. 3 is a flow chart for explaining reverse power flow preventing operation by a controller of the AC interconnection apparatus according to the first embodiment.

The flow chart of FIG. 3 shows an example of reverse power flow preventing operation of this embodiment. FIG. 3 is a flow chart for explaining reverse power flow preventing operation by the controller of the AC interconnection apparatus 1 according to the first embodiment.

First, in step S1, the voltage of the commercial power system, which is obtained from the connection point Vs, is detected. In step S2, the load current is detected by the current detector 16. In step S3, load power PL is calculated from these voltage and current values. The flow advances to step S4 to obtain output power Pi of the inverter 14 from the inverter 14. In step S5, input power from the commercial power system is calculated as the difference between the load power PL and the output power Pi of the inverter 14. In step S6, it is checked whether the input power (PL-Pi) obtained in step S5 is less than a predetermined value (e.g., 0). If YES in step S6, the flow advances to step S7 to decrease the output current of the inverter 14 by a predetermined amount. This operation is repeated until the power input from the commercial power system becomes equal to or more than the predetermined value in step S6.

In the first embodiment, the current detector 16 is arranged between the AC connection point 17 and the load connection terminal 13. Hence, to prevent any reverse power flow, the process of calculating the input commercial power from the output of the inverter 14 and the power of the load 4 is necessary. However, with this process, the object "reverse power flow prevention" can be achieved. In addition, the single current detector 16 suffices, resulting in simple arrangement of the AC interconnection apparatus 1.

② Load Over-current Breaking Operation (Over Load Protection)

As described above, in the first embodiment, since the current flowing to the load 4 is directly measured, it is easy to detect a load over-current and break the current when the load over-current has a predetermined value or more. The operation flow is shown in FIG. 4.

Figure 4:
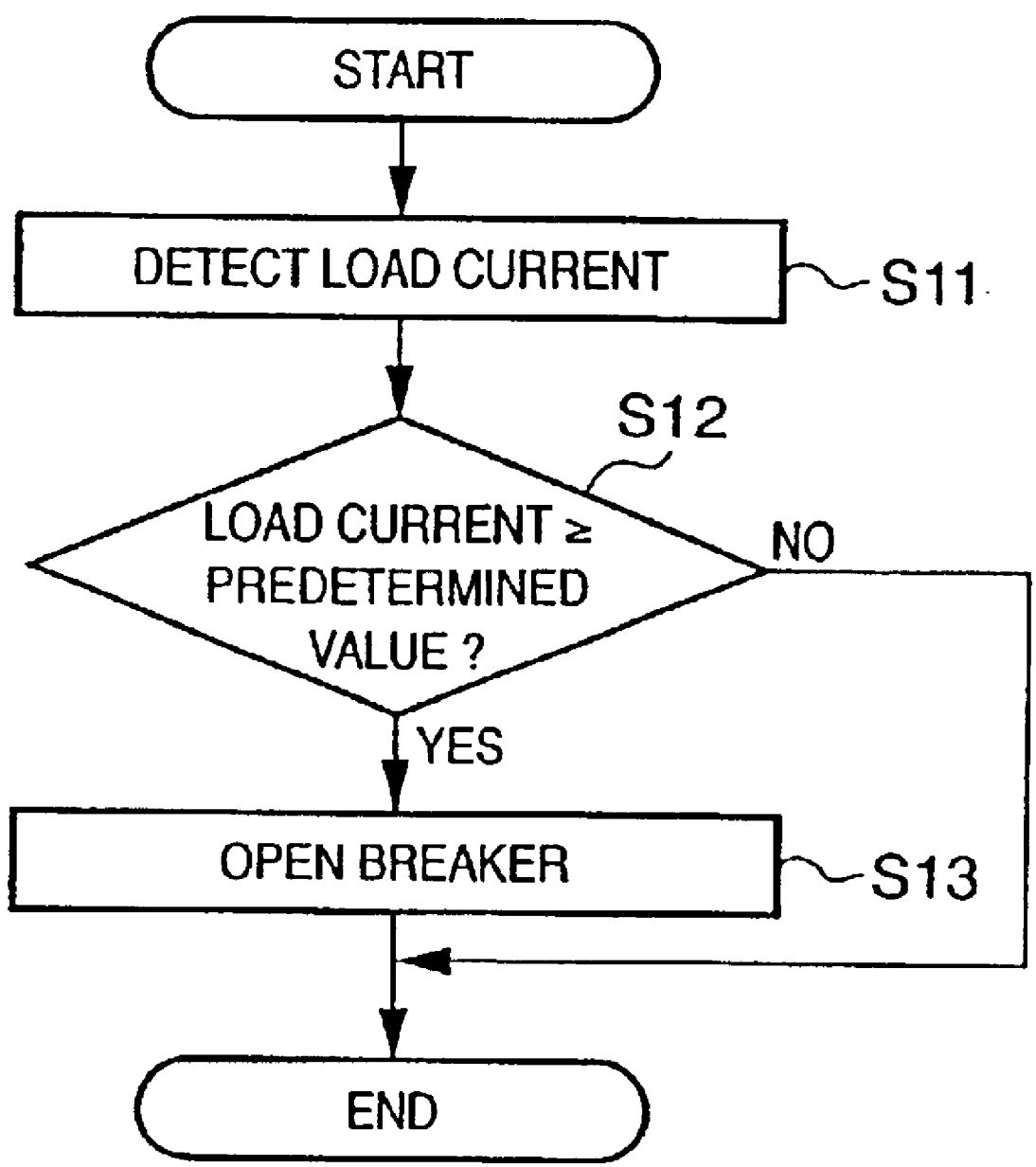
FIG. 4 is a flow chart for explaining load current breaking operation by the controller of the AC interconnection apparatus according to the first embodiment.

FIG. 4 is a flow chart for explaining load current control by the controller of the AC interconnection apparatus 1 according to the first embodiment.

First, in step S11, the load current flowing to the load 4 is detected by the current detector 16. In step S12, it is determined whether the load current exceeds a predetermined value. If YES in step S12, the flow advances to step S13 to open the breaker 18 to execute breaking operation.

It is important here that since the current detector 16 is arranged between the AC connection point 17 and the load connection terminal 13, the load current can be controlled by such considerably simple control operation.

③ Checking Resistance about Stray Capacitance to Ground

In the arrangement shown in FIG. 1, the solar cell 3 is insulated from the commercial power system. Hence, any unnecessary operation of the electrical leakage breaker can be prevented. This will be briefly described below.

As is known, in a solar power generation system in which the power input terminal from the solar cell is uninsulated from the commercial power system, and the stray capacitance to ground is large, generally, an unnecessary leakage current flows. As an experiment, in the AC interconnection apparatus 1 having the arrangement shown in FIG. 1, a 100-$\mu$F capacitor was connected between the solar cell 3 and ground. When the presence/absence of a leakage current was checked, no leakage current was observed. From this viewpoint, in the apparatus of this embodiment, since no leakage current flows, the electrical leakage breaker does not perform any unnecessary operation, and the safety is very high. Since the stray capacitance changes depending on the shape or installation form of the solar cell 3 or the weather, the AC interconnection apparatus 1 of this embodiment, which can be connected to the solar cell 3 and used without taking the presence of such undefined stray capacitance into consideration, is very convenient for people who have no special knowledge.

<Second Embodiment>

The second embodiment of the present invention will be described below.

Figure 5:
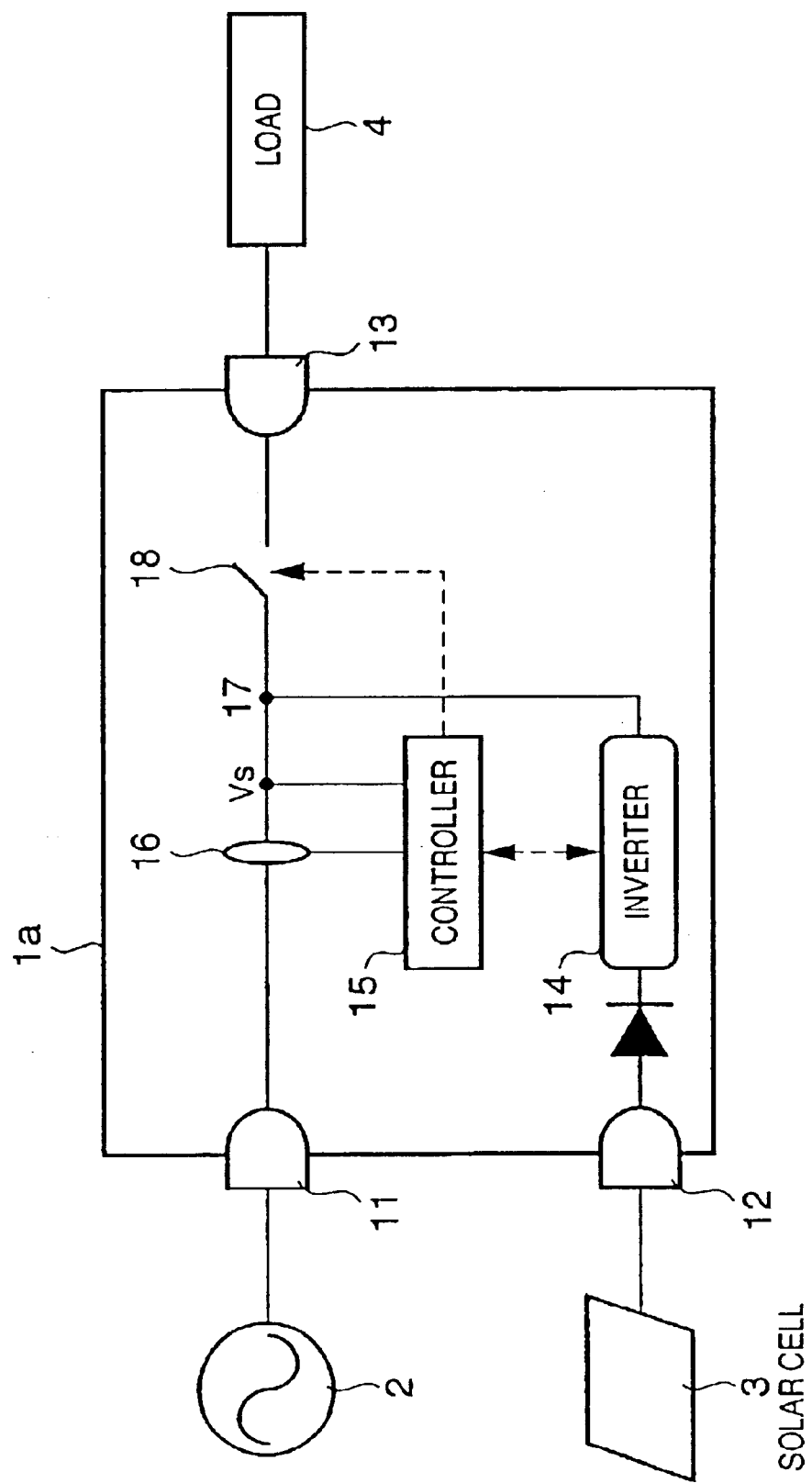
FIG. 5 is a block diagram showing the arrangement of an AC interconnection apparatus according to the second embodiment of the present invention.

An AC interconnection apparatus 1a according to the second embodiment of the present invention has the arrangement shown in FIG. 5. The second embodiment is different from the first embodiment in the position of a current detector 16. In the second embodiment; the current detector 16 is arranged between an AC connection point 17 and an input terminal 11 of a commercial power system 2. When the current detector 16 is arranged at this position, the input/output current at the terminal 11 can be directly measured. The components shown in FIG. 5 are the same as in the above-described first embodiment (FIG. 1), and a detailed description thereof will be omitted. Operation different from the first embodiment will be described below.

[Operation]

① Reverse Power Flow Preventing Operation (Reverse Power-flow Protection)

Figure 6:
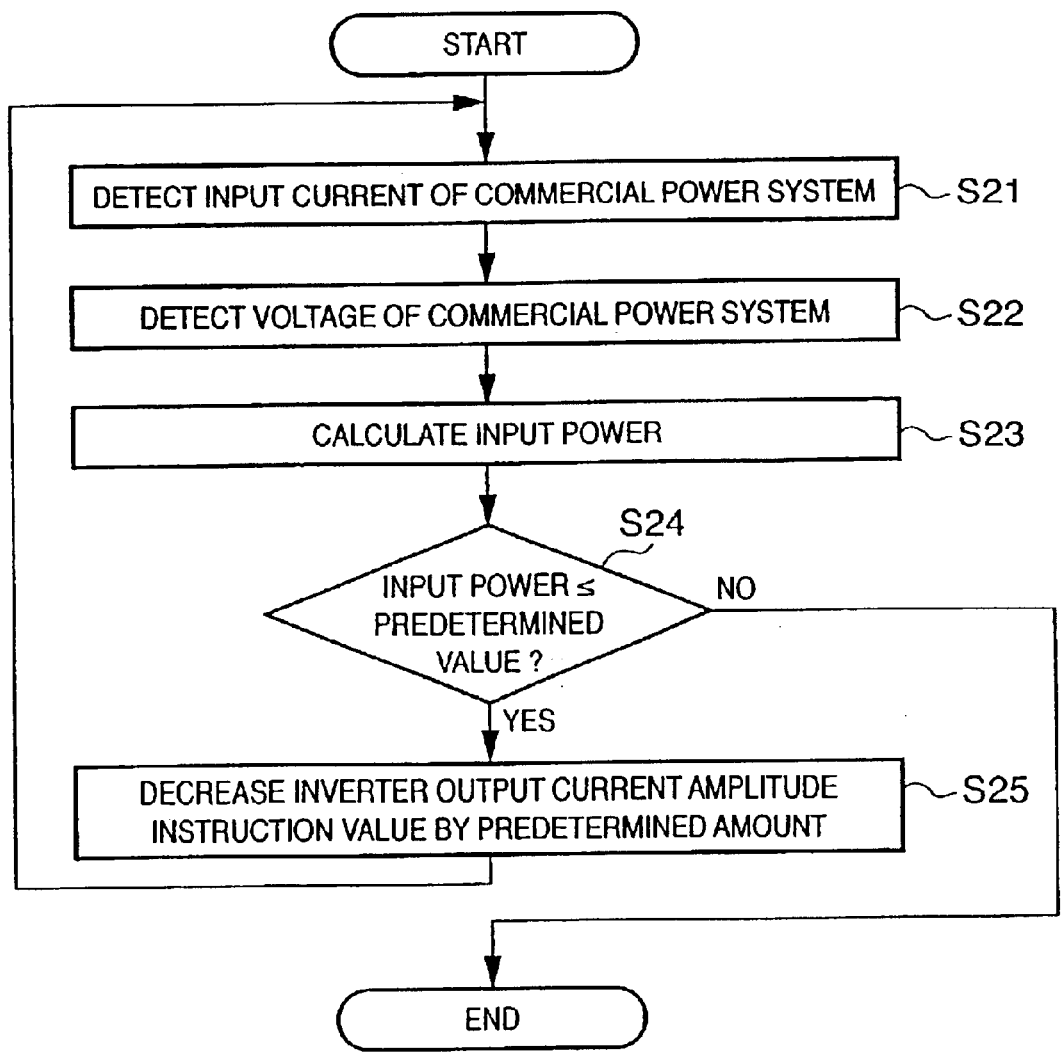
FIG. 6 is a flow chart for explaining reverse power flow preventing operation by a controller of the AC interconnection apparatus according to the second embodiment.

FIG. 6 is a flow chart showing reverse power flow preventing operation by a controller 15 of the AC interconnection apparatus 1a according to the second embodiment of the present invention.

First, in step S21, the current value of the commercial power system is detected by the current detector 16. In step S22, the voltage value of the commercial power system at a connection point Vs is obtained. In step S23, input power PL is calculated from the current value detected in step S21 and the system voltage Vs. In step S24, it is checked whether the power value PL is negative or is less than a predetermined value in consideration of a slight measurement error and the like. If YES in step S24, the flow advances to step S25 to decrease the output current and amplitude instruction value of an inverter 14, thereby suppressing the output of the inverter 14. The amplitude instruction value is gradually decreased by a predetermined amount until no reverse power flow is observed. The output of the inverter 14 may be stopped as needed. When the current detector 16 is arranged at the position shown in FIG. 5 of the second embodiment, the reverse power flow preventing operation can be more simplified.

② Load Over-current Breaking Operation (Overload Protection)

Figure 7:
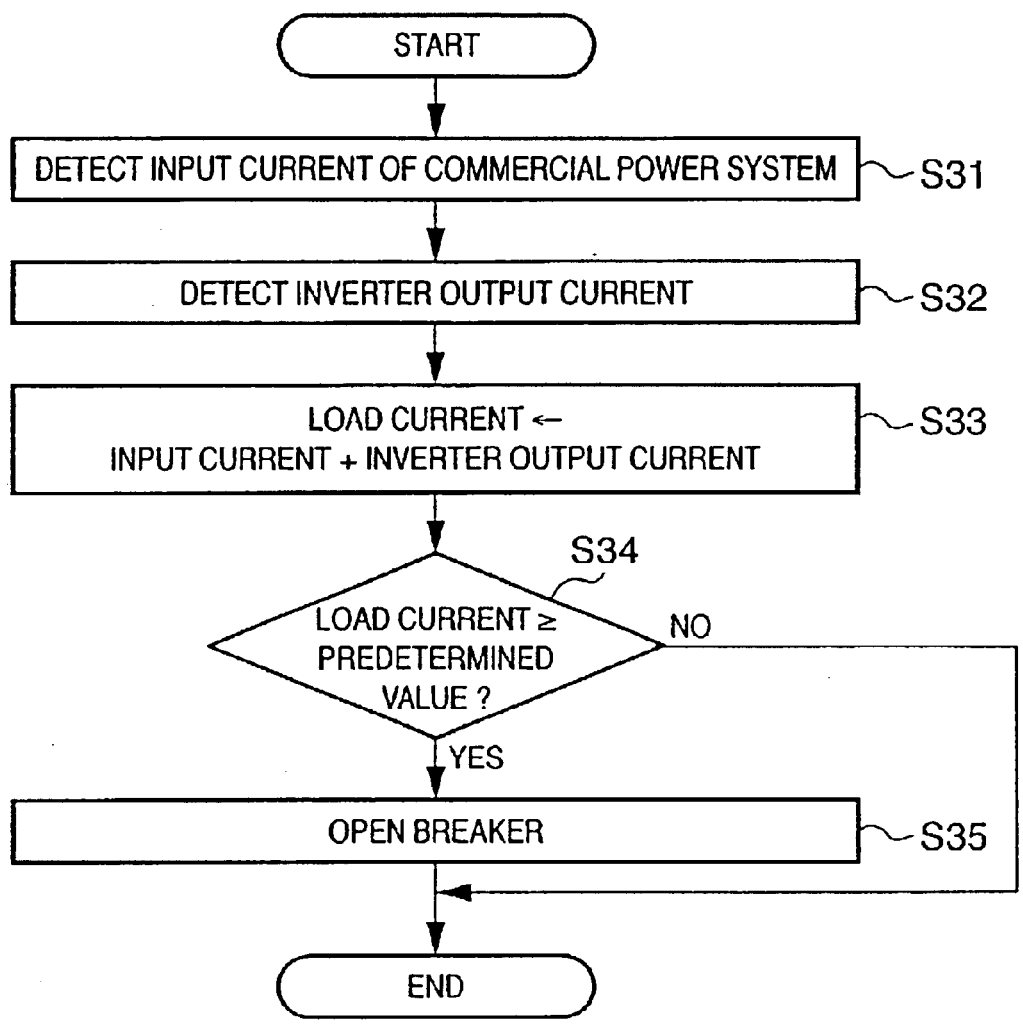
FIG. 7 is a flow chart for explaining load current breaking operation by the controller of the AC interconnection apparatus according to the second embodiment.

FIG. 7 is a flow chart showing processing of controlling a load current by the controller 15 of the AC interconnection apparatus 1a according to the second embodiment of the present invention by detecting a load over-current.

First, in step S31, the input current from the commercial power system is measured by the current detector 16. In step S32, the output current of the inverter 14 is detected. In step S33, a load current flowing to a load 4 is obtained from the sum of the input current obtained in step S31 and the output current of the inverter 14 obtained in step S32. In step S34, it is checked whether the load current has a predetermined value or more. If YES in step S34, the flow advances to step S35 to open a breaker 18 to break the current flowing to the load 4.

To prevent any reverse power flow when the current detector 16 is set at the position of the second embodiment, the process of calculating the load current from the input current from the commercial power system and the output current of the inverter 14 is necessary. However, with this process, the object "load over-current breaking" can be achieved, and the safety increases. In addition, the single current detector 16 suffices, resulting in simple arrangement of the AC interconnection apparatus.

<Third Embodiment>

The third embodiment of the present invention will be described below.

Figure 8:
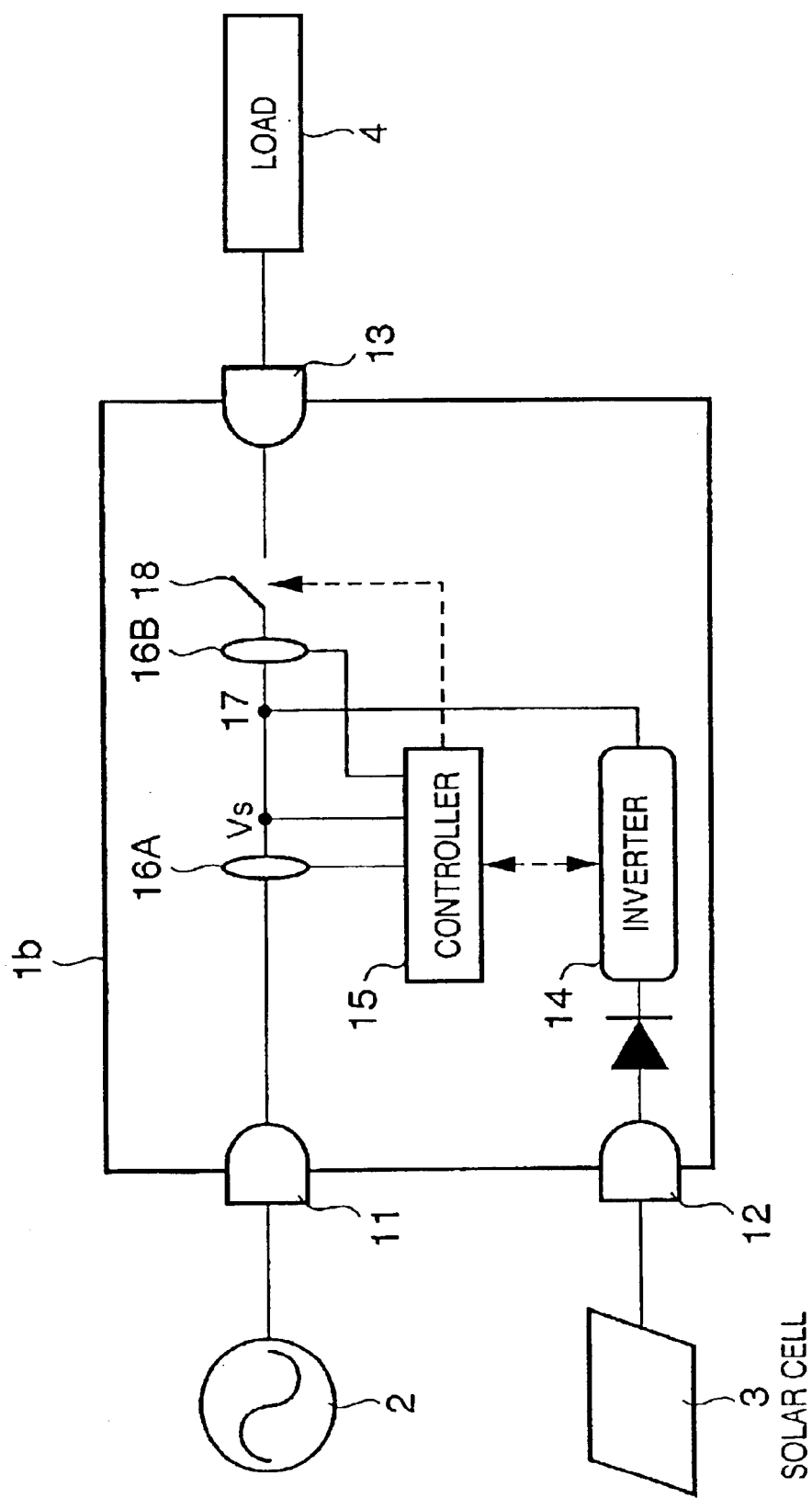
FIG. 8 is a block diagram showing the arrangement of an AC interconnection apparatus according to the third embodiment of the present invention.

FIG. 8 is a block diagram showing the arrangement of an AC interconnection apparatus 1b according to the third embodiment of the present invention. The same reference numerals as in the above-described embodiments denote the same parts in FIG. 8, and a description thereof will be omitted.

In the third embodiment, as shown in FIG. 8, two current detectors (16A and 16B in FIG. 8) are used. With this arrangement, the load current and the input/output current of the commercial power system can be directly measured. Hence, load current breaking operation by the load overcurrent can be executed as in the above-described flow chart of FIG. 4. Reverse power flow preventing operation can be executed according to the flow chart shown in FIG. 6. An inverter 14 need not have a function of detecting the output current or output power, and the structure of the inverter 14 can be simplified.

Although the embodiments have been independently described above, the present invention is not limited to this, and an appropriate combination of the arrangements of the embodiments is also incorporated in the present invention.

The present invention is not limited to the above embodiments and various changes and modifications can be made within the spirit and scope of the present invention. Therefore, to apprise the public of the scope of the present invention, the following claims are made.

What is claimed is:

1. An AC interconnection apparatus for supplying AC power to a load from a commercial power system and/or an output from a solar cell, comprising:

a plug-shaped connection terminal for the commercial power system;

a receptacle-shaped load connection terminal; and a solar cell connection terminal having a shape different from said plug-shaped connection terminal for the commercial power system.

2. An apparatus according to claim 1, wherein said solar cell connection terminal has a shape different from said receptacle-shaped load connection terminal.

* * * * *